(12) United States Patent
Nolewaika

(10) Patent No.: US 9,524,838 B2
(45) Date of Patent: Dec. 20, 2016

(54) METHOD FOR PROTECTING CHARGING CABLE, AND CHARGING DEVICE

(75) Inventor: Martin Nolewaika, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 712 days.

(21) Appl. No.: 13/983,420

(22) PCT Filed: Jan. 26, 2012

(86) PCT No.: PCT/EP2012/051186
§ 371 (c)(1),
(2), (4) Date: Aug. 2, 2013

(87) PCT Pub. No.: WO2012/104188
PCT Pub. Date: Aug. 9, 2012

(65) Prior Publication Data
US 2013/0313918 A1    Nov. 28, 2013

(30) Foreign Application Priority Data
Feb. 2, 2011    (DE) .......... 10 2011 003 518

(51) Int. Cl.
*B60L 1/00*    (2006.01)
*B60L 3/00*    (2006.01)
(Continued)

(52) U.S. Cl.
CPC ........... *H01H 47/00* (2013.01); *B60L 11/1816* (2013.01); *B60L 11/1825* (2013.01);
(Continued)

(58) Field of Classification Search
CPC   B60L 11/1816; B60L 3/0084; Y02T 10/7005; Y02T 10/7088
(Continued)

(56) References Cited

U.S. PATENT DOCUMENTS 3,199,016 A    8/1965   Green et al.
5,596,258 A *  1/1997   Kimura ................. B60L 3/0084
                                                    320/109
(Continued)

FOREIGN PATENT DOCUMENTS

CN    1392626    1/2003
CN    1741346    3/2006
(Continued)

OTHER PUBLICATIONS

International Search Report for PCT/EP2012/051186; mailed Jun. 8, 2012.
(Continued)

*Primary Examiner* — Rexford Barnie
*Assistant Examiner* — Rasem Mourad
(74) *Attorney, Agent, or Firm* — Slayden Grubert Beard PLLC

(57) ABSTRACT

A driving battery of a vehicle that can be electrically driven is charged by determining a resistance value that corresponds to the size of the electrical resistance between two contacts of the charging cable, where the size of the electrical resistance specifies the current-carrying capacity of the charging cable. As a function of the determined resistance value, one of a plurality of line protection devices which are disposed on the charging device is switched into the charge current path.

14 Claims, 2 Drawing Sheets

(51) Int. Cl.
*H02G 3/00* (2006.01)
*H01H 35/00* (2006.01)
*H01H 83/00* (2006.01)
*H01H 47/00* (2006.01)
*B60L 11/18* (2006.01)

(52) U.S. Cl.
CPC ....... *B60L 11/1846* (2013.01); *B60L 2210/40* (2013.01); *B60L 2230/12* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01); *Y10T 307/865* (2015.04)

(58) Field of Classification Search
USPC ................ 307/9.1, 10.1, 112, 113, 116, 131
See application file for complete search history.

(56) References Cited

U.S. PATENT DOCUMENTS

| | | | | |
|---|---|---|---|---|
| 6,456,186 | B1* | 9/2002 | Oglesbee | H01H 85/46 337/159 |
| 6,661,201 | B2 | 12/2003 | Ueda et al. | |
| 2003/0001541 | A1 | 1/2003 | Ueda et al. | |
| 2006/0028167 | A1 | 2/2006 | Czubay et al. | |
| 2008/0141390 | A1* | 6/2008 | Schnable | C07K 14/415 800/292 |
| 2008/0143190 | A1* | 6/2008 | Rebbereh | H02J 5/00 307/113 |
| 2010/0007306 | A1* | 1/2010 | Fukui | B60K 6/445 320/107 |
| 2012/0029728 | A1* | 2/2012 | Hirayama | B60L 11/1838 701/1 |
| 2012/0119702 | A1* | 5/2012 | Gaul | B60L 3/0069 320/109 |

FOREIGN PATENT DOCUMENTS

| | | |
|---|---|---|
| DE | 100 20 076 A1 | 11/2001 |
| DE | 102007032894 A1 | 1/2009 |
| DE | 102009001962 A1 | 10/2010 |
| DE | 102011003518.4 | 2/2011 |
| WO | 2009/010154 A2 | 1/2009 |
| WO | 2010/112251 A1 | 10/2010 |

OTHER PUBLICATIONS

Office Action for German Patent Application No. 10 2011 003 518.4 dated Nov. 24, 2011.
V. Lazzaro, "Ladesysteme fur Elektrofahrzeuge", Rev. 10; MEN-NEKES Elektrotechnik GmbH & Co., D-57399 Kirchhundem; printed from www.emfm.de/downloads/spezifikation-mennekes-ladesysteme-rev10.pdf; 2009.
Electric Vehicle Conductive Charging System—Part 1: General Requirements; International Standard IEC 61851-1:2010, Edition 2.0; Nov. 2010; pp. 1-99 (in English and French).
Chinese Office Action dated Jan. 5, 2015 in corresponding Chinese Patent Application No. 201280007041.2.

* cited by examiner

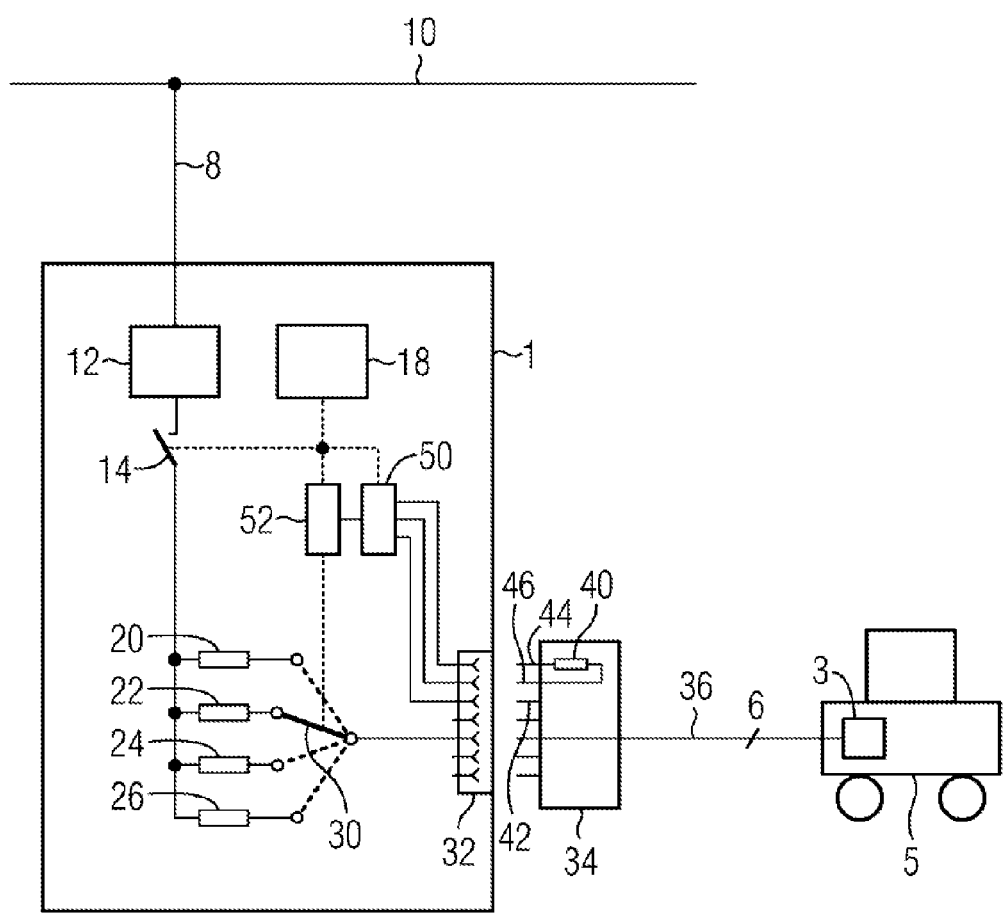

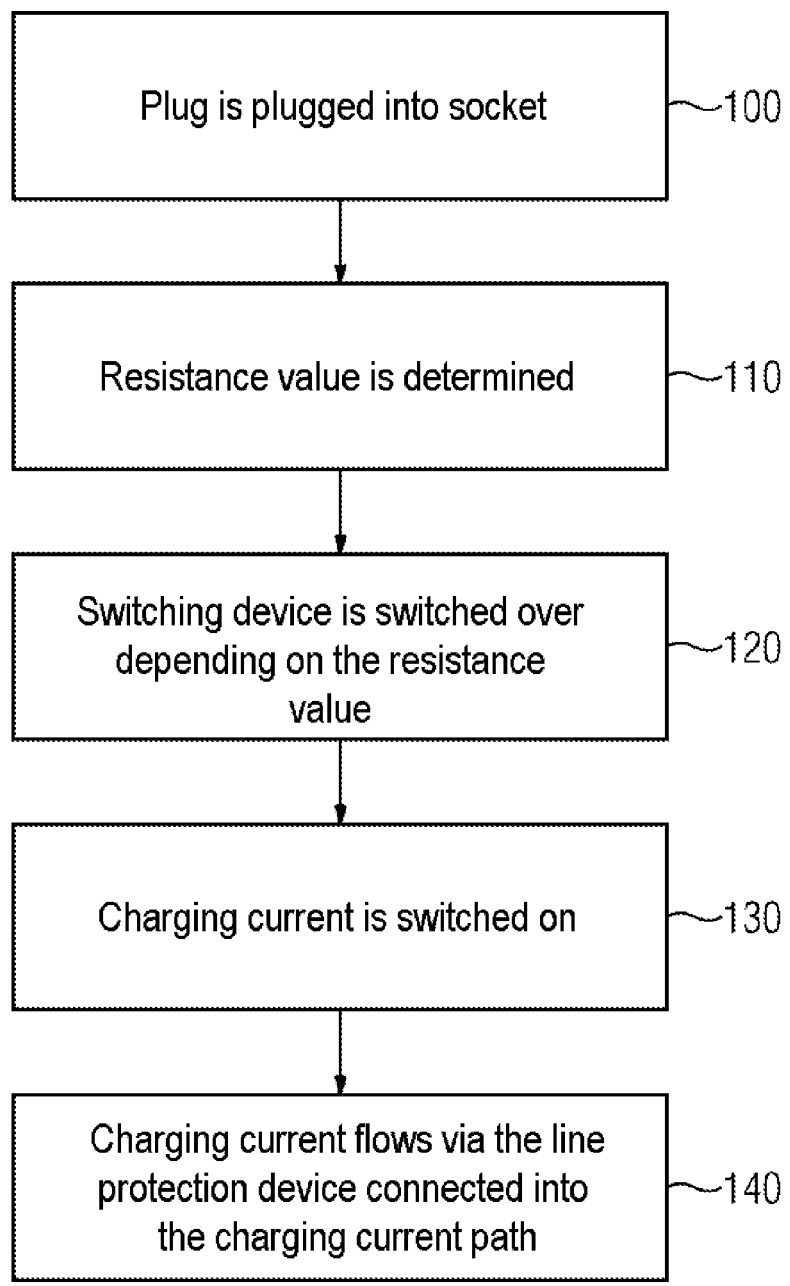

METHOD FOR PROTECTING CHARGING CABLE, AND CHARGING DEVICE

CROSS REFERENCE TO RELATED APPLICATIONS

This application is the U.S. national stage of International Application No. PCT/EP2008/057064, filed Jan. 26, 2012 and claims the benefit thereof. The International Application claims the benefit of German Application No. 10 2007 032 812.7 filed on Feb. 2, 2011, both applications are incorporated by reference herein in their entirety.

BACKGROUND

Described below is a method for protecting a charging cable in a charging device for charging a traction battery of an electrically drivable vehicle and such a charging device.

Electrically drivable vehicles have a traction battery (rechargeable battery) which provides the electrical energy required for the vehicle operation. Discharged batteries need to be recharged by a charging device, if required. For this purpose, the traction battery of the electrically drivable vehicle and the charging device are electrically connected by a charging cable. Corresponding to the current-carrying capacity (electrical conductivity) of the charging cable, the charging cable has different line cross sections. For example, there are charging cables which have a current-carrying capacity of 13 A. Other charging cables have current-carrying capacities of 20 A, 32 A or 63 A, for example. In accordance with the standard IEC 62196-2, such charging cables are provided with electrical plugs which are configured as so-called type 2 plugs, for example. In accordance with this standard IEC 62196-2, these plugs also have the same geometric dimensions when they are intended for charging cables with different current-carrying capacities. Therefore, it is not possible to identify from the geometric dimensions of the plug the current-carrying capacity for which the charging cable connected to the plug is suitable.

In accordance with the standard IEC 61851-1, the current-carrying capacity of the charging cable is specified (coded) for these plugs by a resistance, which is connected between the "proximity" and "PE" contacts of the plug. In this case, a specific resistance value is associated with a specific current-carrying capacity of the charging cable.

SUMMARY

The method and device enable safe and reliable protection of the charging cable during charging.

The method protects a charging cable in a charging device for charging a traction battery of an electrically drivable vehicle by determining a resistance value which corresponds to the magnitude of the electrical resistance between two contacts of the charging cable and one of a plurality of line protection devices, which are arranged in the charging device and are designed for rated current intensities of different magnitudes, that is switched into the charging current path depending on the determined resistance value. In other words, each of the line protection devices is associated with a specific resistance value. In this case, the magnitude of the electrical resistance between the two contacts of the charging cable indicates the current-carrying capacity of the charging cable.

In this method, it is particularly advantageous that the resistance value is determined and a line protection device is switched into the charging current path automatically depending on this determined resistance value. This line protection device has, for example, a rated current intensity which corresponds to the current-carrying capacity of the charging cable, which current-carrying capacity corresponds to the resistance value. As a result, the line protection device appropriate for the current-carrying capacity of the charging cable is automatically switched into the charging current path, with the result that the charging cable is protected by the appropriate line protection device. In this case, it is particularly advantageous that, in the charging device, standard line protection devices for the respectively required rated current intensities can be used. For example, fuses for 13 A, 20 A, 32 A and 63 A can be used. Such line protection devices designed for only in each case one rated current intensity are available at very low cost.

The method can be configured such that the charging current is conducted via the charging current path only once the line protection device has been switched into the charging current path. This ensures that the charging cable is loaded with the charging current only when the charging cable is protected by the line protection device.

The method can also be configured such that a resistance value is determined which corresponds to the magnitude of the electrical resistance between two contacts of a plug of the charging cable. In this case, a resistance value is determined, for example, which corresponds to the magnitude of the electrical resistance between the "proximity" and "PE" contacts of a plug of the charging cable which is constructed in accordance with the standard IEC 62196.

The method can also be implemented in such a way that the charging current is additionally conducted via a residual current circuit breaker (independently of which of the line protection devices has been switched into the charging current path). Residual currents and, for example, a health risk associated therewith for people touching the charging cable can be effectively prevented by this residual current circuit breaker.

The charging device for charging a traction battery of an electrically drivable vehicle has:
    an interface for electrical connection to a charging cable for charging the traction battery,
    a measuring device for determining a resistance value, which corresponds to the magnitude of the electrical resistance between two contacts of the charging cable, wherein the magnitude of the electrical resistance indicates the current-carrying capacity of the charging cable,
    at least two line protection devices which are designed for different rated current intensities (wherein each of the line protection devices is associated with a specific resistance value),
    switching device, which is designed to switch in each case one of the line protection devices into the charging current path, and
    a switching actuation device, which actuates the switching device in such a way that the switching device switches in each case one of the line protection devices into the charging current path depending on the determined resistance value. This charging device is designed for implementing the method described above.

This charging device can have a control device, which conducts the charging current via the charging current path only once the line protection device has been switched into the charging current path.

Furthermore, the charging device can be configured in such a way that the measuring device is designed for determining a resistance value which corresponds to the magnitude of the electrical resistance between two contacts of a plug of the charging cable. In particular, the measuring device can be designed to determine a resistance value which corresponds to the magnitude of the electrical resistance between the "proximity" and "PE" contacts of a plug of the charging cable constructed in accordance with the standard IEC 62196.

The charging device can be realized in such a way that it has a residual current circuit breaker switched into the charging circuit.

This charging device likewise has the advantages specified above in connection with the method.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 1 is a block diagram of an exemplary embodiment of a charging device and

FIG. 2 is a flowchart of an exemplary embodiment of the method for protecting the charging cable.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 illustrates a charging device 1 for charging a traction battery 3 of an electrically drivable vehicle 5. This charging device 1 is connected to an energy supply system 10 by a connection cable 8. Electrical current is conducted from the energy supply system 10 via the connection cable 8 and a residual current circuit breaker 12 to a switch 14 of the charging device 1. The residual current circuit breaker 12 can be designed for a current intensity of 80 A, for example. The switch 14 is actuated by a control unit 18 and can be opened or closed by this control unit 18. Downstream of the switch 14, the circuit branches into a plurality of line protection devices of the charging device which are connected in parallel: in the exemplary embodiment a first line protection device 20 with a rated current intensity of 13 A, a second line protection device 22 with a rated current intensity of 20 A, a third line protection device 24 with a rated current intensity of 32 A and a fourth line protection device 26 with a rated current intensity of 63 A are connected in parallel in the charging device. The four line protection devices 20, 22, 24 and 26 each realize overcurrent protection and short circuit protection. They can be configured as fuses for the current intensities 13 A, 20 A, 32 A and 63 A, for example. The inputs of these line protection devices 20, 22, 24 and 26 are connected to the switch 14, and the outputs of the line protection devices 20, 22, 24 and 26 are connected to a switching device 30.

The switching device 30 is designed in such a way that in each case only one of the four line protection devices 20, 22, 24 and 26 can be switched into the charging current path. Depending on the switch position of the switching device 30, the output of one of the line protection devices 20, 22, 24 or 26 is electrically connected to an interface 32 (socket outlet, bush), which is arranged at the charging device 1. This interface 32 is configured in the exemplary embodiment in such a way that it is compatible with a plug 34 of a charging cable 36. This charging cable 36 connects the charging device 1 to the traction battery 3 of the electrically drivable vehicle 5.

In the exemplary embodiment, the plug 34 is in the form of a so-called type 2 plug, which is constructed corresponding to the standard IEC 62196-2. This plug has seven electrical contacts: four contacts for transmitting three-phase alternating current, one "pilot" contact 42, one "proximity" contact 44 and one "PE" contact 46 (standard IEC 61851-1). A resistance 40 is incorporated in the interior of the plug 34 between the "proximity" and "PE" contacts. In accordance with the standard IEC 61851-1, the rated current of the charging cable 36 is coded by this resistance component 40. The following assignment applies here:

| Charging cable rated current | Resistance value |
|---|---|
| 13 A | 1.5 kΩ |
| 20 A | 680 Ω |
| 32 A | 220 Ω |
| 63 A | 100 Ω |

The charging cable 36 has only 6 lines/cores since it does not have a line for the "proximity" contact.

When the plug 34 is plugged into the interface 32, the "proximity" contact 44 and the "PE" contact 46 of the plug 34, inter alia, are electrically connected to the associated contacts of the interface 32. These contacts of the interface 32 are electrically connected to a measuring device 50 within the charging device 1. (In addition, the "pilot" contact 42 is also connected to the measuring device 50 and therefore also to the control unit 18; communication between the charging device 1 and the vehicle 5 can be implemented via the "pilot" contact.) The measuring device 50 measures the electrical resistance between the "proximity" and "PE" contacts of the plug 34 when the plug 34 is plugged in and thus determines the respective resistance value between these two contacts. This resistance value is passed on to a switching actuation device 52, which actuates the switching device 30 depending on the determined resistance value and initiates switchover of the switching device 30. This switchover is performed in such a way that the rated current intensity of that line protection device which is switched into the charging circuit always corresponds to the current-carrying capacity of the presently used charging cable 36. In other words, each of the line protection devices is associated with a specific resistance value. The line protection device is switched into the charging current path which is associated with the determined resistance value by the switching device 30 depending on the determined resistance value.

The switching actuation device 52 can be in the form of a specific hardware circuit or else in the form of a programmable logic controller (PLC). If the switching actuation device 52 is in the form of a hardware circuit, software errors can be eliminated, with the result that, advantageously, particularly reliable and safe operation can be achieved. As a result, erroneous switching operations can be avoided, with the result that safety classes (SIL classes) can be met. The measuring devices can likewise be in the form of a hardware circuit.

Once the corresponding line protection device (in the exemplary embodiment this is the line protection device 22) has been switched into the charging current path (and possibly in addition communication between the charging device 1 and the vehicle 5 has been implemented via the "pilot" contact), the control unit 18 closes the switch 14, with the result that the charging current can only now flow via the charging current path. As a result, the charging operation is enabled or started. In the exemplary embodiment, the charging current flows from the energy supply system 10 via the connection cable 8, the residual current circuit breaker 12, the switch 14, the second line protection device 22, the switching device (changeover switch) 30, the interface 32, the plug 34 and the charging cable 36 to the traction battery 3 of the electrically driven vehicle 5. This current path forms the present charging current path during charging of the traction battery 3. (Further vehicle-internal devices such as converters, for example, are not illustrated in FIG. 1 for reasons of clarity. Likewise not illustrated is, for example, an electrical interface of the vehicle 5, which is electrically connected to a further electrical plug of the charging cable 36, the further electrical plug likewise not being illustrated.)

FIG. 2 shows, in the form of a flowchart, an exemplary embodiment of the method. The starting point for the method is state 100, in which the plug 34 has been plugged into the interface/socket 32 of the charging device 1. Then, in 110, the resistance value between the "proximity" contact 44 and the "PE" contact 46 of the plug 34 is determined. Therefore, the magnitude of the electrical resistance between the "proximity" contact 44 and the "PE" contact 46 of the plug 34 is determined, i.e. in this case the magnitude of the resistance 40.

Then, in 120, the switching device 30 is switched over depending on the determined resistance value in such a way that the line protection device associated with the determined resistance value is switched into the charging circuit.

Then, in 130, the charging current is switched on. Finally, in 140, the charging current flows via the line protection device switched into the charging current path.

What has been described are a method and a charging device in which the line protection is automatically matched to the respectively used charging cable. This ensures that an appropriate line protection device is automatically switched into the charging current path for each charging cable connected to the charging device.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for protecting a charging cable for a charging device for charging a traction battery of an electrically drivable vehicle, comprising:
    receiving, at an interface of the charging device, a physical connection to a charging cable, the charging cable comprising a set of contacts including at least: at least one current transmission contact configured to communicate a charging current from the charging device, a pilot contact configured to communicate information between the charging device and the vehicle, and a pair of additional contacts connected to each other within the charging cable by a conductive path having an electrical resistance;
    wherein the physical connection of the charging cable to the charging device establishes a connection of a resistance measuring device of the charging device and the pair of additional contacts of the charging cable;
    in response to the physical connection of the charging cable to the charging cable, the resistance measuring device of the charging device determining a resistance value corresponding to a magnitude of the defined electrical resistance between the pair of additional contacts of the charging cable, the magnitude of the electrical resistance indicating current-carrying capacity of the charging cable; and
    the resistance measuring device of the charging device generating and communicating, to a switching device of the charging device, a signal based on the resistance value determined; and
    in response to receiving the signal from the resistance measuring device, the switching device of the charging device switching one of a plurality of line protection devices arranged in the charging device into the charging current path depending on the resistance value determined.

2. The method as claimed in claim 1, further comprising preventing the charging current from being conducted via the charging current path until after the line protection device has been switched into the charging current path.

3. The method as claimed in claim 1, further comprising conducting the charging current via a residual current circuit breaker.

4. The method as claimed in claim 2, further comprising conducting the charging current via a residual current circuit breaker.

5. The method as claimed in claim 1, wherein the conductive path having the electrical resistance between the pair of additional contacts of the cable is located in a plug of the charging cable.

6. The method as claimed in claim 5, further comprising conducting the charging current via a residual current circuit breaker.

7. The method as claimed in claim 1, further comprising conducting the charging current via a residual current circuit breaker.

8. A charging device for charging a traction battery of an electrically drivable vehicle using a charging cable, the charging device comprising:
    an interface providing an electrical connection to the charging cable, the charging cable comprising a set of contacts including at least: at least one current transmission contact configured to communicate a charging current from the charging device, a pilot contact configured to communicate information between the charging device and the vehicle, and a pair of additional contacts connected to each other within the charging cable by a conductive path having an electrical resistance;
    a measuring device that becomes connected to the pair of additional contacts of the charging cable upon connection of the charging cable to the interface of the charging device, the measuring device configured to determine a resistance value corresponding to a magnitude of the defined electrical resistance between the pair of additional contacts of the charging cable, the magnitude of the electrical resistance indicating current-carrying capacity of the charging cable, and to generate and transmit a signal based on the resistance value determined;
    at least two line protection devices having rated current intensities with different magnitudes;
    a switching device configured to switch one of the line protection devices into the charging current path; and a switching actuation device configured to receive the signal from the resistance measuring device and actuate the switching device to switch a selected one of the line protection devices into the charging current path depending on the resistance value determined.

9. The charging device as claimed in claim 8, further comprising a control device conducting the charging current via the charging current path only after the line protection device has been switched into the charging current path.

10. The charging device as claimed in claim 8, further comprising a residual current circuit breaker switched into the charging circuit.

11. The charging device as claimed in claim 9, further comprising a residual current circuit breaker switched into the charging circuit.

12. The charging device as claimed in claim 8, wherein the charging cable has a plug, and conductive path having the electrical resistance between the pair of additional contacts of the cable is located in the plug of the charging cable.

13. The charging device as claimed in claim 12, further comprising a residual current circuit breaker switched into the charging circuit.

14. The charging device as claimed in claim 8, further comprising a residual current circuit breaker switched into the charging circuit.

* * * * *